United States Patent
Hill et al.

(10) Patent No.: US 6,453,209 B1
(45) Date of Patent: Sep. 17, 2002

(54) COMPUTER-IMPLEMENTED METHOD AND APPARATUS FOR INTEGRATING VEHICLE MANUFACTURING OPERATIONS

(75) Inventors: Cameron T. Hill, Troy; John W. Wood, Lake Orion; Daniel J. Rakoczy, Sterling Heights; Deborah A. Honnila, White Lake, all of MI (US); Andrew J. Moro, Windsor (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/387,956

(22) Filed: Sep. 1, 1999

(51) Int. Cl.$^7$ .............................................. G06F 19/00
(52) U.S. Cl. ..................................... 700/95; 700/117
(58) Field of Search ......................... 700/95, 97, 100, 700/106, 108–110, 114, 182, 86, 79, 115; 707/502; 703/1; 705/27–29

(56) References Cited

U.S. PATENT DOCUMENTS

| | | | |
|---|---|---|---|
| 4,472,783 A | 9/1984 | Johnstone et al. ........... 700/182 |
| 4,561,060 A | 12/1985 | Hemond ...................... 700/113 |
| 4,669,047 A | 5/1987 | Chucta ....................... 700/182 |
| 4,887,218 A | 12/1989 | Natarajan ................... 700/113 |
| 4,961,148 A | 10/1990 | Holda et al. .................. 700/97 |
| 5,033,014 A | 7/1991 | Carver et al. ............... 700/182 |
| 5,036,479 A | 7/1991 | Prednis et al. .............. 702/121 |
| 5,150,288 A | * 9/1992 | Imai et al. ................... 700/115 |
| 5,153,839 A | 10/1992 | Cross ......................... 700/112 |
| 5,166,874 A | 11/1992 | Nomaru et al. ............... 700/79 |
| 5,211,523 A | 5/1993 | Andrada Galan et al. .. 414/282 |
| 5,212,635 A | 5/1993 | Ferriter ...................... 700/100 |
| 5,255,197 A | 10/1993 | Iida ............................ 700/108 |
| 5,307,261 A | 4/1994 | Maki et al. .................... 705/29 |
| 5,341,304 A | 8/1994 | Sakamoto et al. .......... 700/110 |
| 5,467,285 A | 11/1995 | Flinn et al. .................... 700/95 |
| 5,469,361 A | * 11/1995 | Moyne .......................... 700/95 |
| 5,552,995 A | 9/1996 | Sebastian ..................... 700/97 |
| 5,664,180 A | * 9/1997 | Halpert et al. .............. 707/102 |
| 5,699,242 A | 12/1997 | Togawa et al. ................. 700/5 |
| 5,761,093 A | 6/1998 | Urbish et al. ................. 700/97 |
| 5,796,986 A | 8/1998 | Fuller ......................... 700/107 |
| 5,822,206 A | 10/1998 | Sebastian et al. ............. 700/97 |
| 5,822,716 A | 10/1998 | Morell et al. ................. 702/55 |
| 5,835,377 A | 11/1998 | Bush ........................... 702/55 |
| 5,864,482 A | 1/1999 | Hazama et al. ............. 700/901 |
| 5,883,805 A | 3/1999 | Sada .......................... 700/100 |
| 5,910,894 A | 6/1999 | Pryor ........................... 700/95 |

* cited by examiner

*Primary Examiner*—Leo Picard
*Assistant Examiner*—Kidest Bahta
(74) *Attorney, Agent, or Firm*—Mark P. Calcaterra

(57) ABSTRACT

A computer-implemented method and apparatus for designing and manufacturing vehicles in a distributed design environment and manufacturing plant environment. A database is provided for storing vehicle design data (e.g., tool, part, weld, and torque data) related to the vehicles. A process sheet data structure is used to interrelate the tool, part, weld, and torque data in order to generate process sheet data that depicts the assembly process of the vehicles. The assembling process contains the steps to assemble the vehicles. A manufacturing plant data structure is linked to the process sheet data structure for containing station data and production data for assembling the vehicles in the manufacturing plants. The manufacturing plant data structure associates the station data with the process sheet data in order to indicate the assembly steps for a station contained within the manufacturing data structure. A financial data structure is used to link to the manufacturing plant data structure in order to contain financial data associated with the assembly of the vehicle and the manufacturing plant.

20 Claims, 11 Drawing Sheets

Fig-7B

AMPS PROCESS SHEET

| Item | Operation Description | Tool#/Fixture | PI | Item | Operation Description | Tool#/Fixture | PI |
|---|---|---|---|---|---|---|---|
| 1 | OBTAIN AND REMOVE FROM PLASTIC BAG | | | | | | |
| 2 | REMOVE (OUTSIDE) DOOR HANDLE RT OR LT | PLANT TO FURNISH | SH | | | | |
| 3 | DISPOSE (DISCARD) PLASTIC BAG INTO WASTE CONTAINER | | | | | | |
| 4 | OBTAIN (OUTSIDE) HANDLE LINK RIGHT OR LEFT CODED ON LATCH END IN FOLLOWING WAY: RT HAND PART (04646264) HAS TWO DAUBS OF PAINT | | | | | | |
| 5 | LT HAND PART (04646265) HAS ONE DAUB OF PAINT | | | | | | |
| 6 | ASSEMBLE (SUB-ASSEMBLE) BY INSERTING END OF LINK INTO HOLE IN CLIP (P.I.A. OF DOOR HANDLE) AND PRESSING LINK INTO RETAINING LEG OF THE CLIP TO SECURE | | | | | | |

Program: YYYY-JA
Division: ASSEMBLY
Plant: SH
Center: T/C/F
Platform: LARGE CAR

SPECIAL REQUIREMENTS | Status: RELEASED

AMPS PROCESS SHEET

| Item | Operation Description | Tool#/Fixture | PI | Item | Operation Description | Tool#/Fixture | PI |
|---|---|---|---|---|---|---|---|
| 1 | OBTAIN (OUTSIDE) DOOR HANDLE SUB-ASSY RT OR LT | | | | DRIVER-SOCKET C.S. 1/4-D-1/4-6N | 93-490-1300 | |
| 2 | POSITION TO DOOR HANDLE OPENING | NONE | | | SOCKET C.S. 8MM-6MS-1/4 L X 2 IN CORNWELL # MMS-0208 R | 93-869-0901 | |
| 3 | FIRST POSITION LINK THEN INSTALL HANDLE TO OPENING IN DOOR OUTER PANEL | | | | | | |
| 4 | | | | | | | |
| 5 | LOOSE-ASSEMBLE (NUTS) (2) | | | | | | |
| 6 | INSTALL (MANUALLY LOOSE ASSEMBLE) TO STUDS (P.I.A. OF DOOR HANDLE) IN CLIP (P.I.A. OF DOOR HANDLE) USING ACCESS HOLES THEN TIGHTEN TO SPECIFIED TORQUE USING: NUTRUNNER TORQUE CONTROL PISTOL GRIP 1/4 QUICK CHANGE CHUCK | 87-621-4000 | | | | | |
| 7 | | | | | | | |

SPECIAL REQUIREMENTS

Status: RELEASED

Program: YYYY-JA
Division: ASSEMBLY
Plant: SH
Center: T/C/F
Platform: LARGE CAR

Fig-8B

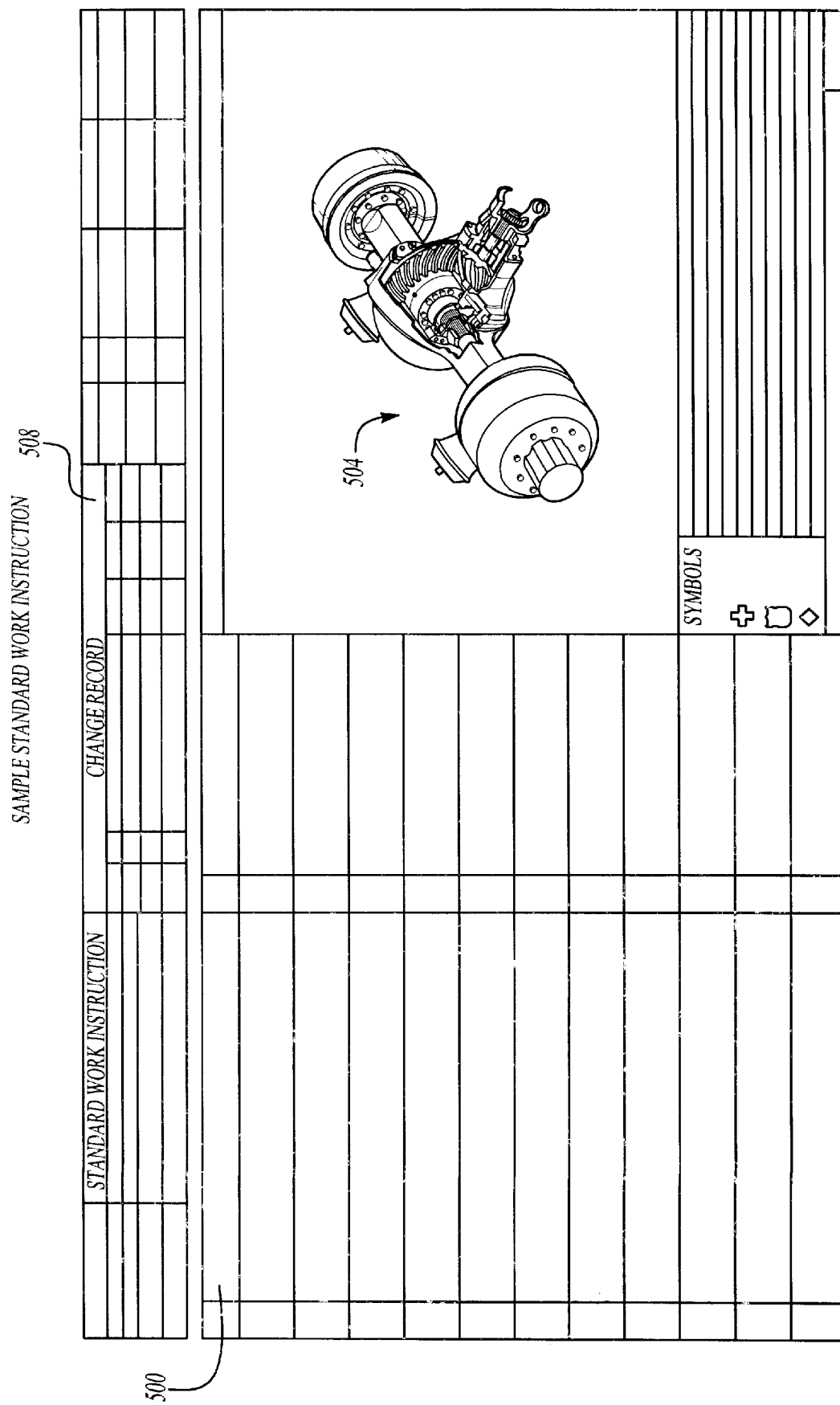

| SYMBOL | KEY POINT: includes Gages, Tools, Equipment, REF. Documents Required, & PN/ENG. Change Level | | | | | | GRAPHIC | | |
|---|---|---|---|---|---|---|---|---|---|
| | | | | | | | | SYMBOLS | SYMBOL EXPLANATIONS/OTHER INFORMATION |
| | VERIFY CORRECT BRACKET | | | | | | | | |
| | ELECTRIC GUN SHUTS OFF AUTOMATICALLY WHEN DESIRED TENSION REACHED | | | | | | | ✢ ▢ ◇ | |

Fig-11

COMPUTER-IMPLEMENTED METHOD AND APPARATUS FOR INTEGRATING VEHICLE MANUFACTURING OPERATIONS

BACKGROUND OF THE INVENTION

1. Field of the Invention

The present invention relates generally to computer-implemented vehicle manufacturing systems, and more particularly, to computer-implemented systems for integrating vehicle manufacturing operations.

2. Background and Summary of the Invention

As vehicle technology becomes more complex, the manufacturing of the vehicles increases correspondingly in complexity. Complexity increases the number of design decisions that must be communicated to the vehicle manufacturing environment. A lack of communication or poor communication of design decisions to the manufacturing environment may have a significant impact upon the quality of the vehicle being manufactured and may result in a large number of vehicles being recalled for correction.

Design decisions are also affected by what vehicle plant personnel uncover during vehicle assembly. The feedback by plant personnel needs to be more effectively and efficiently communicated to the proper design personnel.

In addition to the difficulty in communicating information between design personnel and plant personnel, a need also exists to provide vehicle design and plant data to financial departments so that costs can be accurately determined. Integration and communication of data from these different groups are difficult due to the complexity associated with the ever increasingly more technical vehicles and their manufacturing operations.

The present invention overcomes the aforementioned disadvantages as well as other disadvantages. In accordance with the teachings of the present invention, a computer-implemented method and apparatus is provided for designing and manufacturing vehicles in a distributed design environment and manufacturing plant environment. A database, preferably a relational database, is provided for storing vehicle design data (e.g., tool, part, weld, and torque data) related to the vehicles. A process sheet data structure is used to interrelate the tool, part, weld, and torque data in order to generate process sheet data that depicts the assembly process of the vehicles. The assembly process contains the steps to assemble the vehicles. A manufacturing plant data structure is linked to the process sheet data structure for containing station data and production data for assembling the vehicles in the manufacturing plants. The manufacturing plant data structure associates the station data with the process sheet data in order to indicate the assembly steps for a station contained within the manufacturing data structure. A financial data structure is used to link to the manufacturing plant data structure in order to contain financial data associated with the assembly of the vehicle and the manufacturing plant.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIGS. 7a–7b comprise a sample report depicting an exemplary process sheet;

FIGS. 8a–8b comprise a sample report depicting a second exemplary process sheet;

FIG. 9 is a sample report depicting an exemplary standard work instruction report; and FIGS. 10 and 11 are sample reports depicting additional exemplary standard work instruction reports.

DETAILED DESCRIPTION OF THE PREFERRED EMBODIMENTS

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Figure 1:
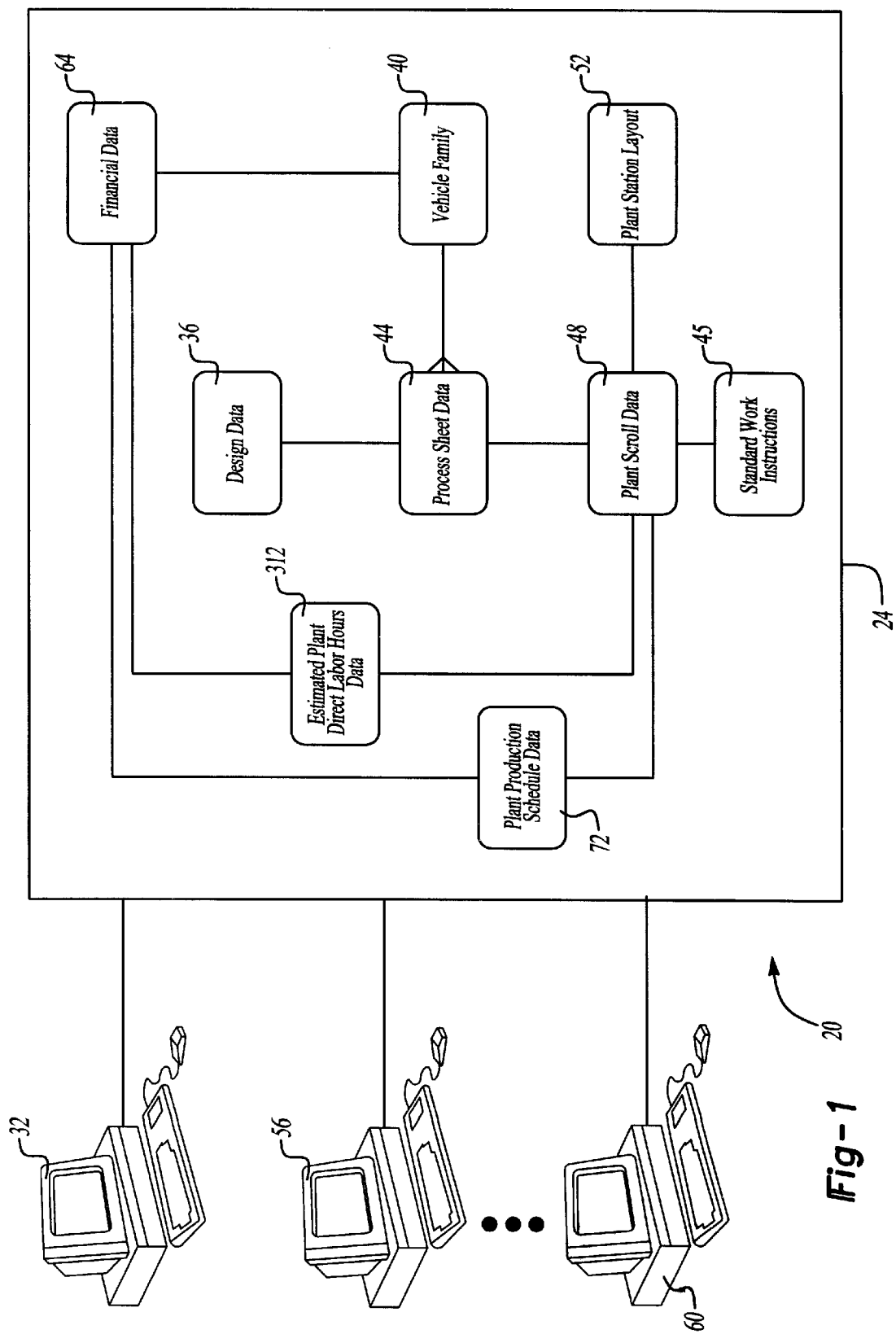
FIG. 1 is a block diagram depicting the software and data components of the present invention.

FIG. 1 depicts the integrated automated design and manufacturing planning system that integrates top level vehicle engineering design data with manufacturing plant data and with financial information. This comprehensive integrated data set 24 from the different aspects of vehicle design, manufacturing, and financing is accessible by computers 28. Computers 28 can be located at different geographical locations and used for the different operations of producing a vehicle. For example, computer 32 can be located in a vehicle engineering design center in Detroit, Michigan, and can be used to update and modify engineering design data 36 associated with a particular vehicle family 40. It should be understood that the present invention is not limited to vehicle 40 referencing a family of vehicles, since it can also be used in alternate embodiments to refer to specific vehicles.

Design data 36 is used to build process sheets in a data structure 44 that provides the assembly steps and other aspects for manufacturing a vehicle family 40. Engineering design data can include, but is not limited to, Electronic Bill of Material (EBOM) parts data, welding data, torque data, tooling data, graphic illustrations, safety data and failure modes and effects (FMEA) analysis.

Since the manufacturing of a vehicle family 40 requires many steps, multiple process sheets are associated with vehicle family 40. For example, one process sheet may include assembling a subassembly link to an outside door handle, while another process sheet is used to install that subassembly to the door of a vehicle.

Data regarding a particular vehicle assembly plant is associated with the appropriate data in process sheet data structure 44 in order to assemble vehicle family 40. Scroll data structure 48 includes a plant station layout data structure 52 in order to associate which vehicle assembly stations within a particular plant should be associated with what process data in process sheet data structure 44. Plant scroll data structure 48 includes, but is not limited to, the number of people at a particular assembly station, function of each person, and which data in plant scroll data structure 48 a particular station should receive. In the preferred embodiment, data in process sheet data structure 44 is converted into a station work instruction data sheet 45 so as to specify in an ISO-9000 compliant manner the work assignments for plant personnel.

Plant scroll data structure 48 can be populated by computer 56 at a plant located in Saint Louis, Mo. Moreover, computer 60 located at the company's headquarters can generate data for financial data structure 64 based upon both data from an estimated plant direct labor hours structure 312 and plant production scheduled data structure 72. Estimated plant direct labor hours data 312 are generated by a labor standards software module. This data is used as a manpower budget for the plant and compared to the actual manpower the plant is using in the plant scroll data structure 48.

Moreover, due to the access of the plant production schedule data, equipment ordering is greatly simplified. For example, plant production schedule data structure 72 may indicate for a particular plant that every fifth vehicle for a predetermined period of time shall receive an air conditioning unit. Personnel responsible for creating work station assignments need to be aware of the production schedule in terms of the model and option mix (such as air conditioning) and how it will affect manning levels. Financial data structure 64 is also updated to reflect the financial impact within the vehicle manufacturing company for ordering and installing such a number of air conditioning units for that particular plant.

The linking of vehicle-related data from many different areas provides for a highly integrated engineering and manufacturing processing system. The term "link" between two sets of data is synonymous with the term "join" in the relational database computer field. Accordingly, the term "link" is not limited to a physical link, but rather denotes that two sets of data can logically relate to each other. For example, FMEA data can be linked to part data or to a process step by associating the relevant FMEA data with a part number or with a process step number. In the preferred embodiment, substantially all data sets are linked by a common process identifier in one or more distributed relational databases.

A non-limiting advantage of such linkings is that a change in design data 36 flows automatically to the plant level which can impact data contained in financial data structure 64. Another advantage is that due to the integration of production schedule data, plant data, and process sheet data, work loads performed at plant stations can be optimized such that a proper number of people are staffed at each assembly or inspection station.

Figure 2:
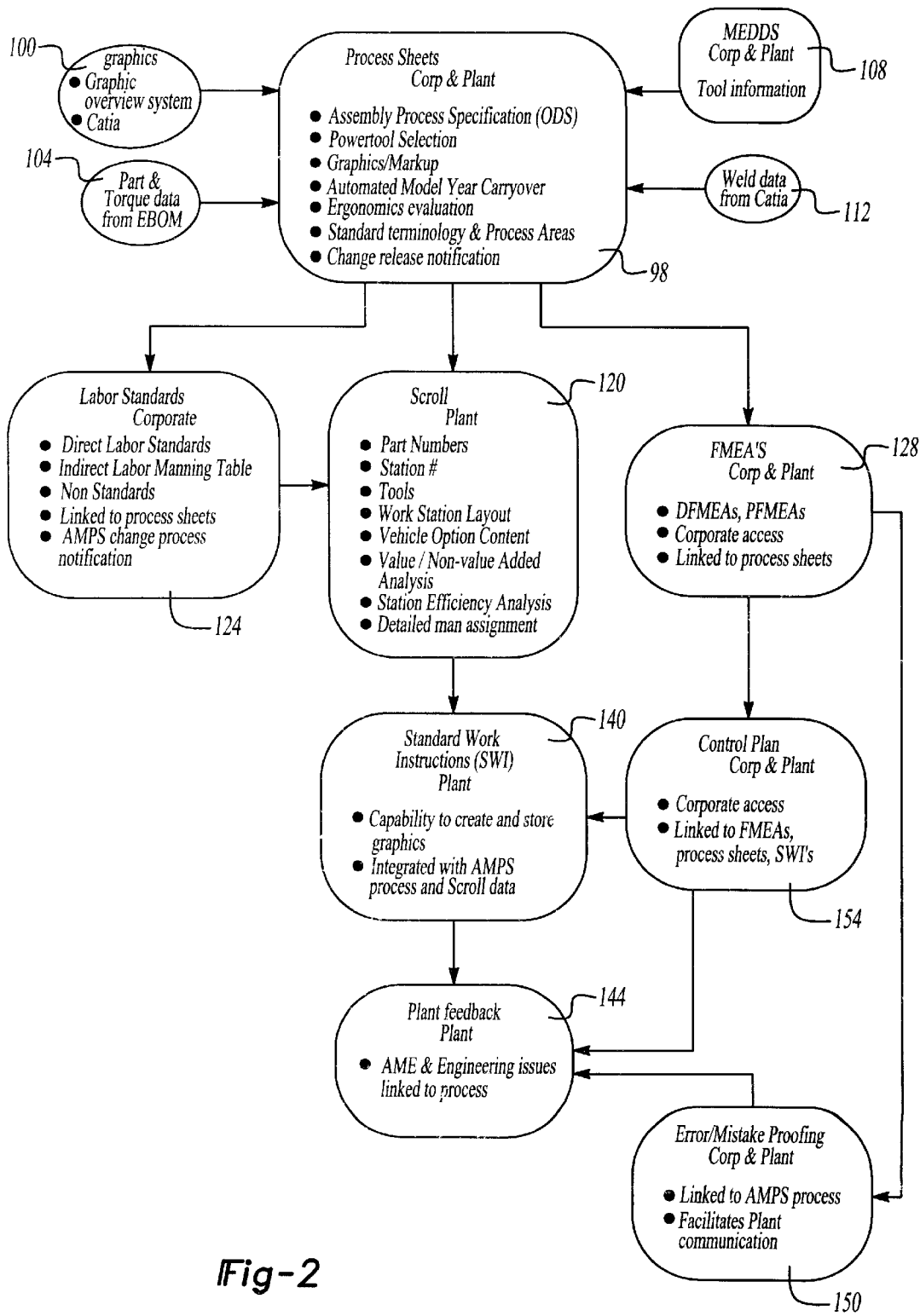
FIG. 2 is a process flow diagram depicting the utilization of process sheet data within the system of present invention.

FIG. 2 depicts the process flow for generating process sheet data and its use within the manufacturing system. Process sheet data module 98 generates process sheet data from graphics that were preferably created and stored in the CATIA CAD/CAM (computer-aided design/computer-aided manufacturing) system 100. The CATIA computer program is available from the following company: Dassault Systems located in France. Part and torque data 104 is provided to process sheet data module 98 and is preferably generated from an electronic bill of materials. Tooling and cost information is provided by a equipment development description system 108, and weld data as preferably stored in the CATIA system is furnished at process block 112.

Process sheet data module 98 generates process sheet data that includes: an assembling process specification (i.e., steps to assemble a particular vehicle); graphic markups which are used for associating portions of the graphical description of the process to text items which describe the process in words; safety data; automated model year carryover; ergonomics evaluation (e.g., work load optimization); standard terminology and process area; and change release notification to downstream applications.

Process sheet data is used by station scroll module 120, labor standards module 124, and failure modes and effects (FMEA) module 128. Station scroll module 120 uses process sheet data in order to associate which process sheet data should be associated with what part numbers, at what station number, and with what tools. Station scroll module 120 can make this association (e.g., link) since it has access to the work station layout data. Moreover, station scroll module 120 includes a vehicle option content which is used to specify the production option mix and build volumes for the plant. Station scroll module 120 can provide a value/non-value time analysis via personnel entering the standard minutes for an operation in terms of value added time and non-value added time for parts, tools, walk and miscellaneous work elements. Due to its link with process sheet data structure 44 and detailed man assignment information, station scroll module 120 can perform station efficiency analysis in order to determine which station are understaffed or overstaffed.

Using the data generated by station scroll module 120, station work instruction module 140 generates data that provide specific instructions for personnel at a particular manufacturing station. The station work instruction data not only contains textual descriptions of the instructions, but also includes graphics that depict the assembly sequence for that particular station, as well as notations for whether a particular step has particular OSHA safety aspects, governmental regulations, or customer satisfaction characteristics.

Standard work instruction module 140 also associates the work instructions with International Standards Organization (ISO) 9000 documentation to ensure that controls exist such that the printed standard work instruction matches the information of the process sheet data that is stored in the computer database.

Plant feedback module 144 allows plant personnel to enter comments or questions about the process into the system of the present invention which are accessible via a computer network by engineers at the vehicle company's design center. This is another example of the integrated nature for the different areas of vehicle design and manufacturing. Information is conveyed from engineering design personnel to the personnel associated with plant operations as well as the flow of information back from the plant level to engineering design personnel.

Process sheet data is also utilized by labor standards module 124 in order to associate labor standards with the assembly process information generated by process sheet data module 98. Data generated by labor standards module 124 include information related to both direct labor standards and indirect labor manning table data. In particular, labor standards module 124 utilizes process sheet data as input in order to assign a time as to how long a particular process step on a process sheet should take. Moreover, labor standards module 124 generates a direct labor budget for each process sheet based upon the number of hours and the skill level of the person performing the work. With this information, the finance department assigns a dollar amount to the overall process sheet.

FMEA module 128 associates both design FMEAs and process FMEAs with process sheet data, and is linked to the process sheet data. This FMEA data is provided to an error/mistake proofing module 150 in order to assist plant personnel to identify causes of errors that occur at the plant as well as what are the possible effects of the error having occurred. The information generated by module 150 is utilized by the plant feedback module 144 so that issues that are raised regarding the process can be better analyzed with the FMEA data.

FMEA module 128 also provides data to control plan module 154 in order to report on the FMEA data that is linked to the process sheet data of module 98 as well as its connection with respect to the station work instruction data generated by module 140. This linkage by module 154 is provided to plant feedback 144 so that a more comprehensive evaluation of any manufacturing issues that arise can be performed.

Figure 3:
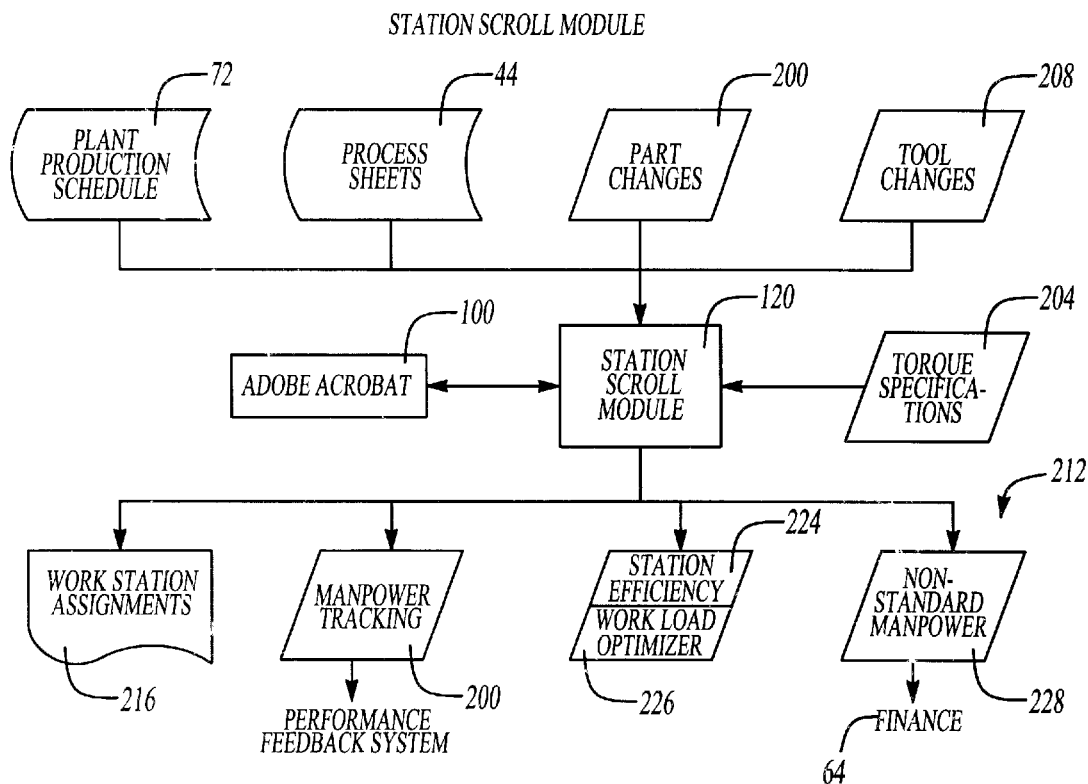
FIG. 3 is a block diagram depicting the component interfaces for the station scroll module.

FIG. 3 depicts the component interfaces associated with station scroll module 120. Station scroll module 120 utilizes plant production schedule 72, process sheet data 44, part changes 200, torque specifications 204, and tool changes 208 in order to generate the output generally depicted at reference numeral 212. Station scroll module 120 examines plant production schedule 72 for a particular plant and generates work station assignments 216 in order to associate which personnel should perform what assignments in order to best meet the production schedule requirements. The production schedule requirements are used to generate man power tracking reports 220 which are used in a performance feedback system that examines the efficiency of man power allocations.

Station scroll module 120 also provides information wherein station efficiency is examined. Station efficiency module 224 includes an workload optimization module 226 that attempts to balance the workload across multiple stations that is established via plant production schedule 72. Station scroll module 120 also produces information in order to evaluate non-standard manpower data, such as a process that was missed or that has been revised in the plant. The information related to non-standard manpower 228 is used to generate financial data 64.

Figure 4:
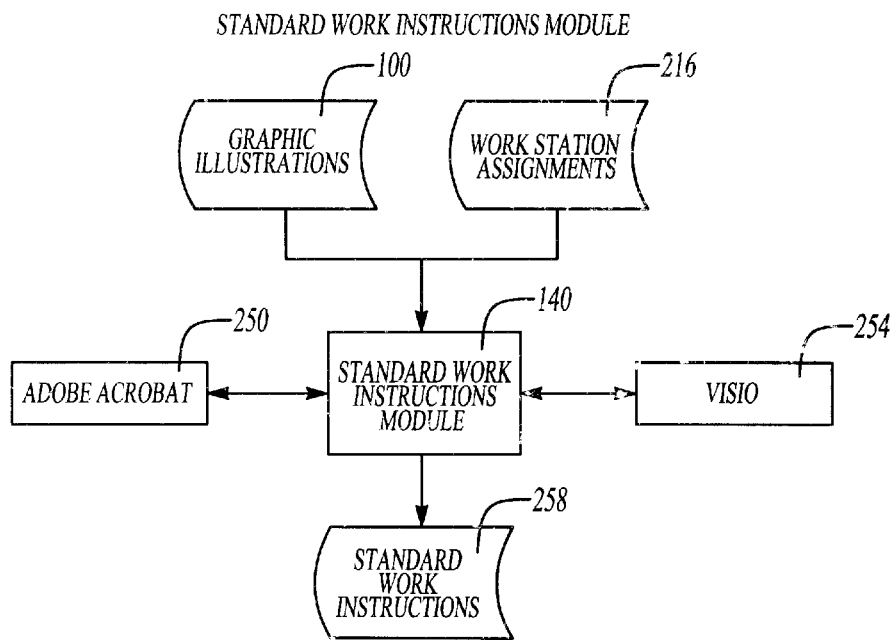
FIG. 4 is a block diagram depicting the components interfaces for the standard work instructions module

FIG. 4 depicts the interfaces associated with the standard work instructions module 140. Standard work instructions module 140 receives data inputs regarding work station assignments 216 from the station scroll module as well as graphic illustrations 100 from process sheet data module 98. In the preferred embodiment, standard work instructions module 140 can store and retrieve graphic illustrations 100 either in an Adobe Acrobat format 250 or in an Visio data format 254. Based upon these inputs, standard work instruction module 140 generates standard work instructions data 258.

Figure 5:
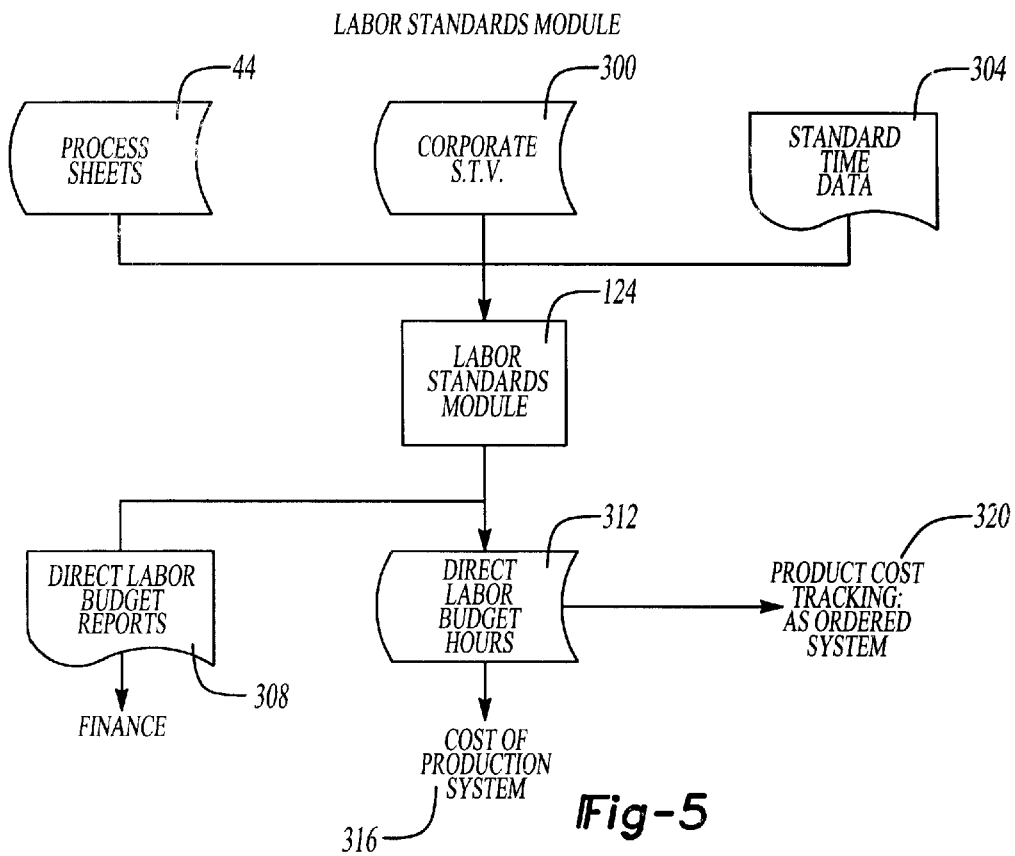
FIG. 5 is a block diagram depicting the component interfaces for the labor standards module.

FIG. 5 depicts the interfaces associated with the labor standards module 124. Labor standards module 124 uses as inputs process sheet data 44, Corporate S.T.V. 300 (S.T.V. is an acronym for Specify The Vehicle), and standard time data 304. Based upon these inputs, labor standards module 124 generates: direct labor budget reports 308 (which are used by a vehicle company's finance department); direct labor budget hours 312 which reflect the cost of the production system; cost or production system 316; and the product cost tracking for the "as ordered" system 320. The cost of production system 316 differs from product cost tracking for the "as ordered" system 320 in the following manner: the costs of production system calculates the total average labor hours used to build the vehicles in a plant by using volumes based on the actual vehicles being built and shipped; the "as ordered" system uses estimated planning volumes to calculate the total average labor hours.

Figure 6:
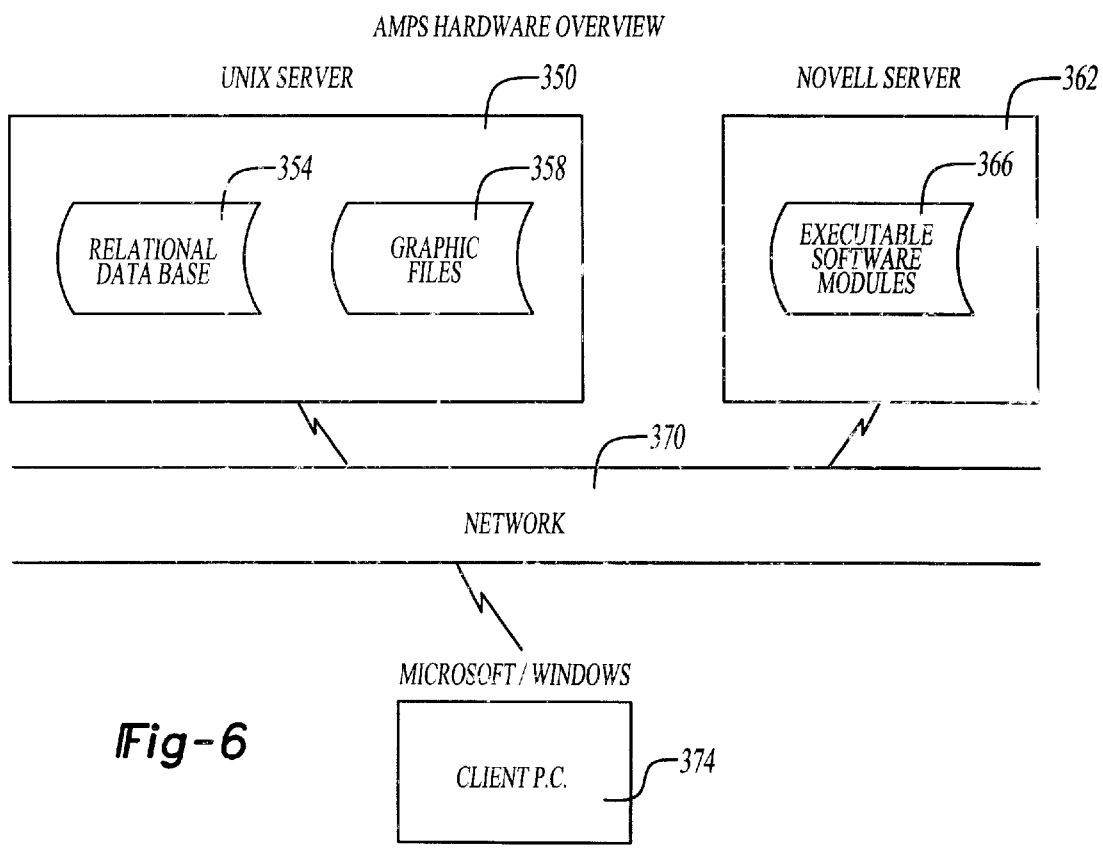
FIG. 6 is a hardware block diagram depicting computer hardware for implementing the preferred embodiment of the present invention.

FIG. 6 depicts the hardware that is used in the preferred embodiment of the present invention. An Unix server 350 contains a relational data base 354, such as is available from Sybase. Relational database 354 stores the data associated with the process sheet data. Unix server 350 also preferably stores the graphic illustrations in the format of Adobe Acrobat Portable Document Format (.PDF), Window Meta-File Format (.WMF) and Tag Image File Format (.TIF). A Novell server 362 stores the executable software modules 366, such as, but not limited to, the database applications that are used to access the data stored in relational database 354 as well as the graphic files 358. In the preferred embodiment, the executable software modules 366 utilize client/server and web-based tools such as Visual BASIC, Java and Java Script in order to access the data stored in relational database 354 and the graphic files 358.

Users of the present invention access the programs and the data that are located on Unix server 350 and Novell server 362 via network 370. In the preferred embodiment, users utilize a Windows-based computer platform 374 in order to access the programs and data. Platform 374 can be located at different geographic locations, such as Detroit, Michigan or in Missouri, or even in a foreign country. Security measures are utilized by the system to ensure that only proper users have access to the programs and data of the present invention.

Figure 7A:
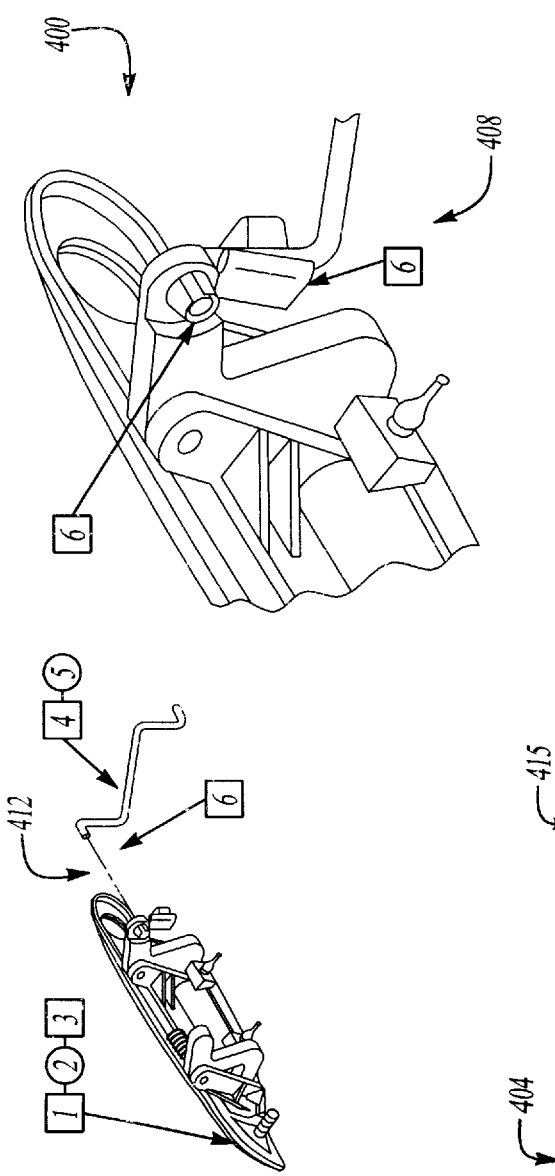

FIGS. 7a–7b depict an exemplary process sheet that was generated by the process sheet module. This exemplary process sheet depicts the process steps associated with providing a subassembly link to an outside door handle. FIG. 7a depicts a graphic depiction at reference numeral 400 for the step-by-step process related to the subassembly link to the outside door handle. Each step of the particular process is numbered within graphic 400 in order to better convey the assembly sequence. Reference numeral 415 shown in a tabular formal an association between an item with what parts are required as well as the quantity. With this type of information, coupled with the estimated and real-time production data, financial data can be determined.

Within graphic 400, the preferred embodiment utilizes three different symbols to differentiate whether a process step is directed to a process, a part, or an explanatory note. Legend 404 is preferably shown adjacent to the graphic to remind the user which symbol is used for which purpose. In this example, six steps are associated with the sub assembly link to the outside door handle. The present invention also includes the feature of showing a magnified view of a particular step of the process. For example, with respect to process step six, a magnified view 408 is depicted for the regular view of process step six shown at reference numeral 412.

FIG. 7b provides the textual description for the process steps depicted on FIG. 7a. With respect to FIG. 7b, item column 420 includes six items which correspond to the six steps shown on FIG. 7a.

Figure 8A:
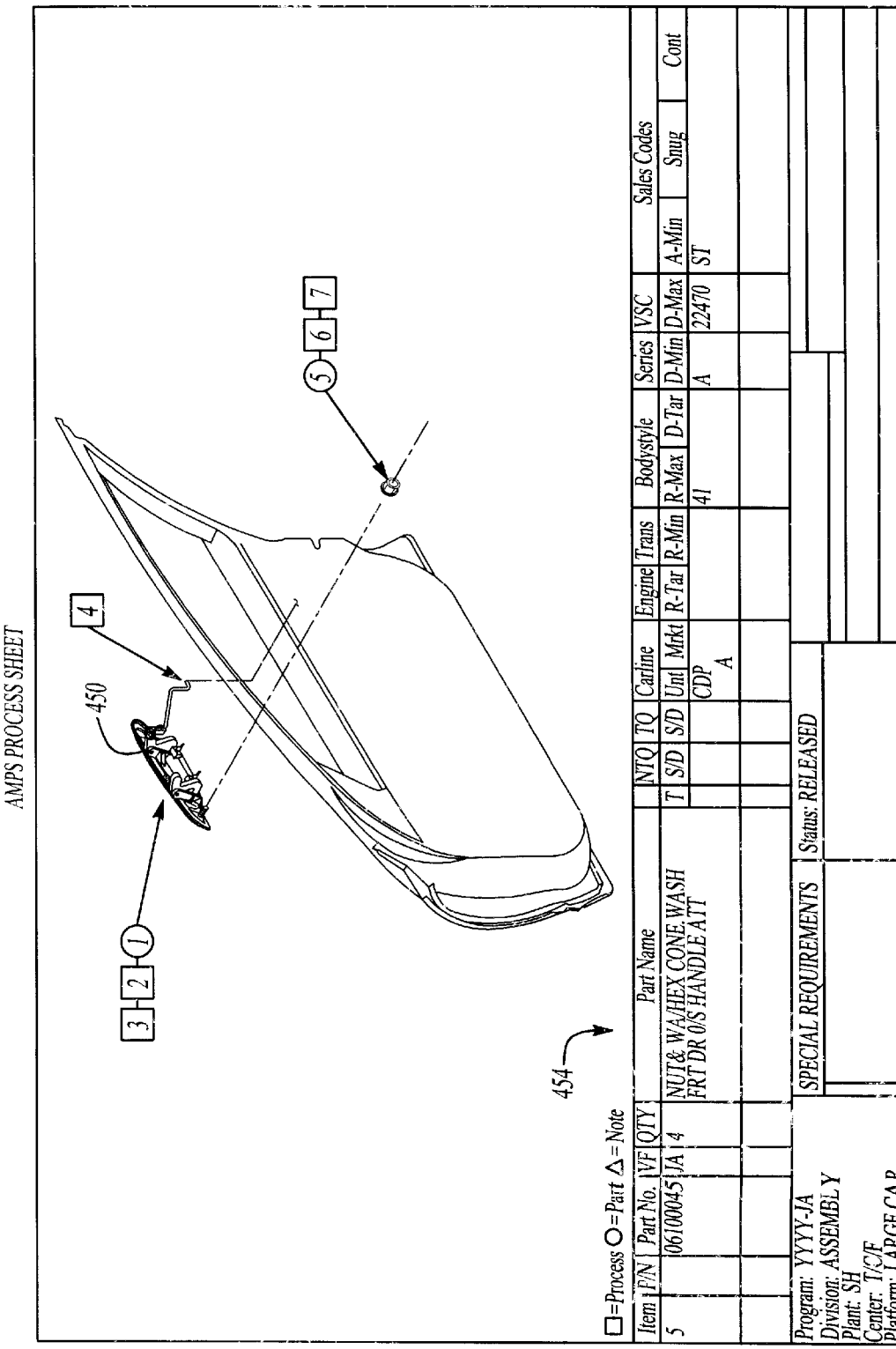

FIGS. 8a–8b depict a process sheet associated with the vehicle door assembly steps that are performed after the steps depicted in FIG. 7a. The particular process involved with the process sheet of FIGS. 8a and 8b is the installation of the front door outside handle to the door. The subassembly link of FIG. 7a is shown in FIG. 8a at reference numeral 450. Part information is shown at reference numeral 454 and a textual description of the process steps is provided in FIG. 8b.

FIG. 9 depicts a standard work instruction exemplary data sheet. This exemplary standard work instruction data sheet is based upon process sheet data that is generated by the process sheet module. However, the standard work instruction data sheet contains the data in a different format in order to better suit the operations performed at a particular station.

With respect to each operational sequence shown in column 500, symbols are utilized to depict whether a particular operational step has particular OSHA safety aspects, governmental regulations, customer satisfaction characteristics or special disposal requirements having environmental impact. For example, installation of a particular part may include that the part be installed at a specific torque and with tight tolerances. The vehicle manufacturing company may have been experiencing a number of complaints that during operation of the vehicle by a number of customers, the part had become unseated. Consequently, this operational step that installs the part on the vehicle should be performed at higher quality standard levels than normal.

In addition to the textual operation sequence 500, a graphic is provided as shown by reference numeral 504. Legend 508 contains standard work instruction documentation information, such as, but not limited to, what changes have occurred to this particular standard work instruction sheet. Legend 508 provides the information necessary for the report to comply with ISO 9000 requirements.

Figure 10:
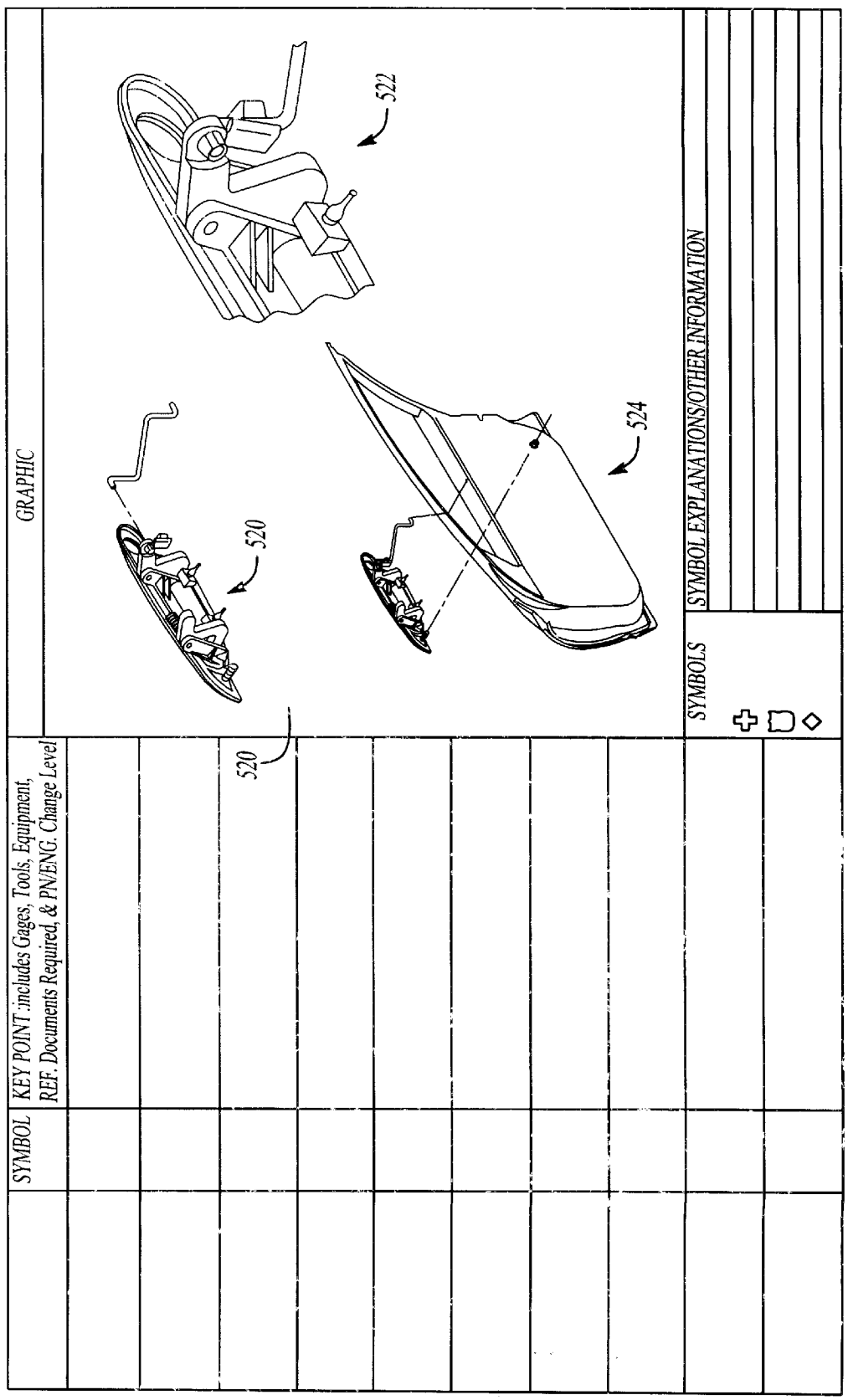

FIG. 10 is a sample report depicting an additional exemplary standard work instruction report. The present invention as a convenience depicts within graphic window 520 several steps of the process. For example, reference numerals 520 and 522 depict the process steps shown in FIG. 7a. reference numeral 524 depicts the process step shown in FIG. 8a.

FIG. 11 is a sample report depicting another exemplary standard work instruction report. Column 530 depicts several examples of key points being associated with certain operational steps. For example, the product regulatory point "verify correct bracket" is associated with the operational step directed to installing the accelerator. Graphic window 532 depicts graphics of how portions of the vehicle should appear when the assembly process has been completed.

Various other advantages of the present invention will become apparent to those skilled in the art after having the benefit of studying the foregoing text and drawings taken in conjunction with the following claims.

What is claimed is:

1. A computer-implemented system for designing and manufacturing vehicles in a distributed design environment and manufacturing plant environment, comprising:
   a database for storing vehicle engineering design data related to the vehicles;
   a process sheet data structure for interrelating the vehicle engineering design data in order to generate process sheet data that depicts the assembling process of the vehicles, said assembling process containing steps to assemble the vehicles;
   a manufacturing plant data structure linked to the process sheet data structure for containing assembly station data and production data for assembling the vehicles in manufacturing plants, said manufacturing plant data structure associating the station data with the process sheet data in order to indicate the assembling steps for a station contained within the manufacturing data structure;
   a financial data structure linked to the manufacturing plant data structure for containing financial data associated with the assembling of the vehicle in the manufacturing plants.

2. The system of claim 1 wherein the vehicle engineering design data includes part, torque, tooling, and weld data related to the assembling process.

3. The system of claim 1 further comprising:
   graphic files for being incorporated into the process sheet data, said graphic files visually depicting steps associated with assembling a vehicle.

4. The system of claim 1 wherein the manufacturing plant data structure includes associating the stations with resources that operate the stations.

5. The system of claim 4 further comprising:
   a workload balancer module for balancing the workload with respect to the stations.

6. The system of claim 4 further comprising:
   a workload balancer module for balancing the workload with respect to the stations using the resources that are associated with their respective stations.

7. The system of claim 4 further comprising:
   a workload analysis module for determining the workload with respect to the stations using the resources that are associated with their respective stations.

8. The system of claim 7 wherein the workload analysis module determines at least one station that is understaffed with respect to performing steps associated with the station.

9. The system of claim 1 wherein the process sheet data structure indicates for at least one step a predetermined assembly aspect, said predetermined assembly aspect being selected from the group consisting of safety-related assembly aspect, product regulatory-related assembly aspect, customer satisfaction-related assembly aspect, and combinations thereof.

10. The system of claim 1 further comprising:
    a failure analysis module for associating at least one process step with failure modes and effects data that is related to the process step.

11. The system of claim 1 further comprising:
    a failure analysis module for associating at least one part related to a process step with failure modes and effects data that is related to the part.

12. The system of claim 1 further comprising:
    a station work instruction module for generating assembly instructions related to an assembly station.

13. The system of claim 12 further comprising:
    a plant feedback module for associating feedback data related to an assembly step in the assembly instructions; and
    a computer network for transmitting the feedback data to engineers in order for the engineers to analyze the feedback data with respect to vehicle design data.

14. The system of claim 1 further comprising:
    a labor standards module connected to the financial data structure for determining labor costs associated with the assembling of the vehicle in the manufacturing plants.

15. The system of claim 14 further comprising:
    an input device for providing standard time data to the labor standards module in order for the labor standards module to determine the labor costs.

16. The system of claim 14 further comprising:
    an input device for providing corporate S.T.V. data to the labor standards module in order for the labor standards module to determine the labor costs.

17. The system of claim 14 further comprising:
    an input device for providing real-time production data of manufacturing plants to the labor standards module in order for the labor standards module to determine the labor costs associated with the manufacturing plants.

18. The system of claim 14 further comprising:

an input device for providing estimated production data of manufacturing plants to the labor standards module in order for the labor standards module to determine the labor costs associated with the manufacturing plants.

19. The system of claim 1 further comprising:

an input device for providing changes to vehicle engineering design data, said process sheet data structure being automatically modified based upon the changes; and a computer network for substantially automatically communicating the modified process sheet data structure to the manufacturing plants such that at least one assembly step in a manufacturing plant is modified based upon the modified process sheet data structure.

20. A computer-implemented system for designing and manufacturing vehicles in a distributed design environment and manufacturing plant environment, wherein engineers generate vehicle design data, wherein plant personnel assemble vehicles at vehicle stations, said system comprising:

a database for storing the vehicle engineering design data that is generated by the engineers;

a process sheet data structure for interrelating the vehicle engineering design data in order to generate process sheet data that depicts the assembling process of the vehicles, said assembling process containing steps to assemble the vehicles;

a manufacturing plant data structure linked to the process sheet data structure for containing assembly station data and production data for assembling the vehicles in manufacturing plants, said manufacturing plant data structure associating the station data with the process sheet data in order to indicate the assembling steps for a station contained within the manufacturing data structure;

a financial data structure linked to the manufacturing plant data structure for containing financial data associated with the assembling of the vehicle in the manufacturing plants.

* * * * *